United States Patent
Lv et al.

(10) Patent No.: US 11,996,211 B1
(45) Date of Patent: May 28, 2024

(54) POLYUREA-BASED SOLID ELECTROLYTE AND PREPARATION METHOD THEREOF

(71) Applicant: SHENZHEN FEIYANG PROTECH CORP., LTD, Guangdong (CN)

(72) Inventors: Wenzhang Lv, Guangdong (CN); Linna Che, Guangdong (CN); En Su, Guangdong (CN); Longhui Zhu, Guangdong (CN); Shankai Luo, Guangdong (CN); Jiang Wu, Guangdong (CN)

(73) Assignee: SHENZHEN FEIYANG PROTECH CORP., LTD, Guangdong (CN)

( * ) Notice: Subject to any disclaimer, the term of this patent is extended or adjusted under 35 U.S.C. 154(b) by 0 days.

(21) Appl. No.: 18/400,450

(22) Filed: Dec. 29, 2023

(30) Foreign Application Priority Data

May 8, 2023 (CN) .......................... 202310509476.7

(51) Int. Cl.
*H01B 1/00* (2006.01)
*H01B 1/12* (2006.01)

(52) U.S. Cl.
CPC .................................. *H01B 1/125* (2013.01)

(58) Field of Classification Search
CPC .......... H01B 1/00; H01B 1/122; H01B 1/125; C25D 17/002; H01M 6/181
See application file for complete search history.

(56) References Cited

U.S. PATENT DOCUMENTS

| | | | |
|---|---|---|---|
| 5,561,214 A * | 10/1996 | Yeske | C09D 175/06 528/363 |
| 9,735,423 B2 * | 8/2017 | Abe | H01M 4/62 |
| 11,046,849 B2 * | 6/2021 | Khani | C09D 175/02 |

FOREIGN PATENT DOCUMENTS

| | | |
|---|---|---|
| CN | 114478985 A | 5/2022 |
| CN | 114479002 A | 5/2022 |
| JP | S63205364 A | 8/1988 |
| JP | H02181366 A | 7/1990 |

OTHER PUBLICATIONS

Bai et al "Polyaspartate Polyurea-Based Solid Polymer Electrolyte with High Ionic Conductivity for the All-Solid-State Lithium-Ion Battery", ACS Omega 2023, 8, 20272-20282.*
National Standards of the People's Republic of China; "Determination of tear strength of vulcanized or thermoplastic rubber (trouser shaped, right angle shaped, and crescent shaped specimens)"; Jun. 4, 2008; 21 Pgs.
First Office Action cited in corresponding Chinese patent Application No. 202310509476.7, dated Mar. 22, 2024, 16 pages.

* cited by examiner

*Primary Examiner* — Mark Kopec
(74) *Attorney, Agent, or Firm* — Cooper Legal Group, LLC

(57) ABSTRACT

A polyurea-based solid electrolyte, raw material components of which includes a first polyaspartic ester, a lithium salt, and an isocyanate curing agent; the ester group of the first polyaspartic ester includes a polyethylene glycol segment structure.

9 Claims, No Drawings

POLYUREA-BASED SOLID ELECTROLYTE AND PREPARATION METHOD THEREOF

CROSS-REFERENCE TO RELATED APPLICATION

This application claims the priority to Chinese patent application No. 202310509476.7, filed on May 8, 2023. The entirety of Chinese patent application No. 202310509476.7 is hereby incorporated by reference herein and made a part of this specification.

TECHNICAL FIELD

This application relates to a field of solid electrolyte technology, particularly to a polyurea-based solid electrolyte and a preparation method thereof.

BACKGROUND ART

Polyurea-based solid electrolytes have been reported, in which a lithium salt is added to a polyether amine-based polyaspartic ester and then an isocyanate curing agent is added for curing. This solid electrolyte combines the features of polyurea and polyethylene glycol but still has some disadvantages.

The ionic conductivity of polyethylene glycol is affected by its crystallinity. In order to reduce the crystallinity of polyethylene glycol, polyether amine is generally used. However, the polypropyl oxide (PPO) segment in polyether amine is unfavorable for the ionic conductivity of the electrolyte. Therefore, there is a problem that the crystallinity and ionic conductivity of the solid electrolyte cannot be simultaneously met, ultimately reflected in the insufficient ion conductivity of polyurea-based solid electrolytes. In addition, the cross-linking density of the polymer electrolyte also affects the ionic conductivity thereof, the greater the cross-linking density, the poorer the movement ability of the polymer segment and the lower the ionic conductivity. In order to avoid the technical problem of a large cross-linking density of the electrolyte in the related art, it is necessary to use a polyether amine with larger molecular weights, which leads to a technical problem that the crystallinity and the ionic conductivity cannot be met simultaneously.

SUMMARY

In order to solve the technical problem that the ionic conductivity of the polyurea-based solid electrolyte is not high enough in the related art, the present application provides a polyurea-based solid electrolyte and a preparation method thereof.

The present application adopts the following technical solution:

a polyurea-based solid electrolyte, the raw material components of the polyurea-based solid electrolyte include a first polyaspartic ester, a lithium salt, and an isocyanate curing agent;

the first polyaspartic ester contains a first resin represented by formula (1),

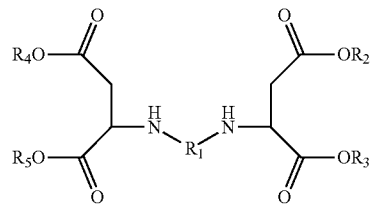

in particular, $R^1$ is a divalent organic group optionally containing one or more heteroatoms, obtained by removing a primary amino group from a corresponding polyamine having an aliphatically, cycloaliphatically, or araliphatically attached primary amino group and having an average molecular weight in a range of from 60 to 6000 g/mol and may contain a further functional group reactive to an isocyanate group and/or inert at temperatures up to 100° C.; $R^2$, $R^3$, $R^4$, and $R^5$ are independently selected from a $C_1$-$C_{18}$ alkyl group or a first polyethylene glycol ether group of the general formula —O(CH$_2$CH$_2$O)$_m$R$^6$, and at least one of $R^2$, $R^3$, $R^4$, and $R^5$ is the first polyethylene glycol ether group, in particular, m=1-250, and $R^6$ is a $C_1$-$C_6$ alkyl group; and a weight of the lithium salt is 3-30% of a weight of the first polyaspartic ester.

In some embodiments, the first resin is obtained by transesterification of a second polyaspartic ester corresponding to $R^2$, $R^3$, $R^4$, and $R^5$ in formula (1) independently selected from a $C_1$-$C_{18}$ alkyl group with a polyethylene glycol monoalkyl ether HO(CH$_2$CH$_2$O)$_m$R$^6$.

In some embodiments, the first polyaspartic ester further contains a second resin represented by the following formula (2),

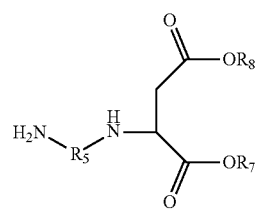

in particular, $R^5$ is a divalent organic group optionally containing one or more heteroatoms, obtained by removing a primary amino group from a corresponding polyamine having an aliphatically, cycloaliphatically, or araliphatically attached primary amino group and having an average molecular weight in the range of from 60 to 6000 g/mol, and may contain a further functional group reactive to an isocyanate group and/or inert at temperatures of up to 100° C.; $R^7$ and $R^8$ are independently selected from a $C_1$-$C_{18}$ alkyl group or a second polyethylene glycol ether group of the general formula —O(CH$_2$CH$_2$O)$_n$R$^9$, in particular, n=1-250, and $R^9$ is a $C_1$-$C_6$ alkyl group; and a weight ratio of the first resin to the second resin is 1-100:1.

In some embodiments, the lithium salt is one or more selected from the group consisting of lithium hexafluorophosphate, lithium tetrafluoroborate, lithium trichloromethyl sulfonate, lithium perchlorate, lithium bistrifluorosulfonimide, lithium bistrifluoromethyl sulfonimide, lithium bis (trichloromethyl sulfonate) imide, and lithium tris (trifluoromethyl sulfonyl) methyl.

In some embodiments, a molar ratio of isocyanate groups in the isocyanate curing agent to active hydrogens on amino groups in the first polyaspartic ester is 1: 1-1.3.

In some embodiments, the isocyanate curing agent includes an adduct of a polyhydroxy polyoxyethylene ether with a polyisocyanate monomer, a content of the isocyanate group in the isocyanate curing agent being not less than 3 wt %.

In some embodiments, the polyhydroxy polyoxyethylene ether has an average molecular weight of 200-10000.

In some embodiments, a molar ratio of hydroxyl groups in the polyhydroxy polyoxyethylene ether to isocyanate groups in the polyisocyanate monomer is 1:1.2-3.

In some embodiments, the isocyanate curing agent further includes an isocyanate trimer, a weight ratio of the adduct to the isocyanate trimer being 50-1:1.

A preparation method for the polyurea-based solid electrolyte according to any of the above embodiments includes the steps of adding the lithium salt to the first polyaspartic ester, dispersing uniformly, adding the isocyanate curing agent, mixing uniformly, shaping, and curing, to obtain the polyurea-based solid electrolyte.

In summary, the present application can achieve at least one of the following beneficial effects:

1. In the present application, polyethylene glycol segments are introduced into the end groups of the polyaspartic ester resin through a transesterification reaction, which can not only increase the polyethylene glycol content of the solid electrolyte, but also increase the ionic conductivity since the polyethylene glycol segment is located at the end group of the cross-linked polyurea three-dimensional network structure rather than on the main chain, and is more prone to movement.
2. In the present application, polyethylene glycol segment located at the end group of the cross-linked polyurea three-dimensional network structure can shuttle in the polyurea three-dimensional network structure and is more prone to movement. When the polyurea is subjected to an external force, it can better absorb the impact of the external force and improve the toughness of the solid electrolyte.
3. The present application further uses an isocyanate curing agent with a relatively large molecular weight, which can avoid the technical problems of electrolyte brittleness caused by the too-large crosslinking density of the polyurea electrolyte and affecting the ionic conductivity. At the same time, by introducing more polyethylene glycol segments into the curing agent, the ionic conductivity of the electrolyte can further be improved.

DETAILED DESCRIPTION

In order to clarify the purpose, technical solution, and advantages of the present invention, a detailed description of the technical solution of the present invention will be provided below.

Throughout the specification, terms used herein should be understood as generally used in the art, unless otherwise indicated. Unless otherwise defined, all technical and scientific terms used herein have the same meaning as commonly understood by one skilled in the art to which the present application belongs. In case of conflict, the present specification shall control.

In an aspect of the present application, proposed is a polyurea-based solid electrolyte, raw material components of the polyurea-based solid electrolyte includes a first polyaspartic ester, a lithium salt, and an isocyanate curing agent;

the first polyaspartic ester contains a first resin represented by formula (1),

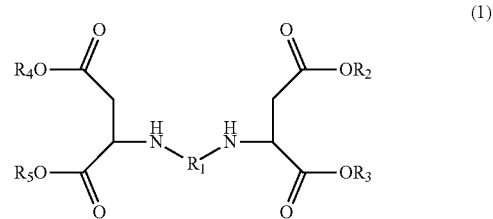

in particular, $R^1$ is a divalent organic group optionally containing one or more heteroatoms, obtained by removing a primary amino group from a corresponding polyamine having an aliphatically, cycloaliphatically, or araliphatically attached primary amino group and having an average molecular weight in the range of from 60 to 6000 g/mol, and may contain a further functional group reactive to an isocyanate group and/or inert at temperatures of up to 100° C.; $R^2$, $R^3$, $R^4$, and $R^5$ are independently selected from a $C_1$-$C_{18}$ alkyl group or a first polyethylene glycol ether group of the general formula —$O(CH_2CH_2O)_mR^6$, and at least one of $R^2$, $R^3$, $R^4$, and $R^5$ is the first polyethylene glycol ether group, in particular, m=1-250, and $R^6$ is a $C_1$-$C_6$ alkyl group; and preferably, m=5-100.

By way of example, the polyamine to which $R^1$ corresponds may be selected from the group consisting of 4, 4'-diamino dicyclohexylmethane, 3, 3'-dimethyl-4, 4'-diamino dicyclohexylmethane, isophorone diamine, 1, 6-hexanediamine, 2-methyl-1, 5-pentanediamine, 3-methyl-1, 5-pentanediamine, 1-methyl-2, 4-cyclohexanediamine, 1,3-cyclohexanebis(methylamine), 1, 2-cyclohexanediamine, 1, 3-cyclohexanediamine, 1, 4-cyclohexanediamine, 1, 3-cyclopentanediamine, o-diamine methylcyclopentane, polyether amine D-230, polyether amine D-400, polyether amine D-2000, polyether amine ED-600, polyether amine ED-900, polyether amine T-403, polyether amine T-5000, polyether amine ED-2300, double-terminal amino polyethylene glycol, etc.

The weight of the lithium salt is 3-30% of the weight of the first polyaspartic ester. In the present application, the weight of the lithium salt is not particularly limited, and may be 3%, 5%, 8%, 10%, 12%, 15%, 17%, 20%, 22%, 25%, 27%, 30%, etc. of the weight of the first polyaspartic ester.

In the present application, at least one of $R^2$, $R^3$, $R^4$, and $R^5$ is the above-mentioned first polyethylene glycol ether group, in particular, the first polyethylene glycol ether group is located on the end group of the polyaspartic ester, high in degree of freedom, which can significantly improve the ionic conductivity of the polyurea electrolyte; further, the first polyethylene glycol ether group with a high degree of freedom can have a certain interaction force with the three-dimensional network structure of the polyurea due to a larger molecular chain, which improves the resistance of the polyurea electrolyte to damage by an external force, and thus improves the strength of the polyurea electrolyte.

In a preferred embodiment of the present application, the first resin is obtained by transesterification of a second polyaspartic ester corresponding to $R^2$, $R^3$, $R^4$, and $R^5$ in formula (1) independently selected from a $C_1$-$C_{18}$ alkyl group with a polyethylene glycol monoalkyl ether $HO(CH_2CH_2O)_mR^6$. In the transesterification of the second polyaspartic ester with the polyethylene glycol monoalkyl ether, one or more of the —$OR^2$, —$OR^3$, —$OR^4$, and —$OR^5$ groups of the second polyaspartic ester is substituted with —$O(CH_2CH_2O)_mR^6$ group to obtain the first resin having the —$O(CH_2CH_2O)_mR^6$ group in the end group. As an example, the first resin can be prepared as follows: adding the second polyaspartic ester and the polyethylene glycol monoalkyl ether $HO(CH_2CH_2O)_mR^6$ into a reaction vessel in a certain molar ratio, and stirring; heating to 90-120° C., and dehydrating under reduced pressure; adding a certain amount of a transesterification catalyst (such as tetraethyl titanate, tetra-n-propyl titanate, tetraisopropyl titanate, tetra-n-butyl titanate, tetraisobutyl titanate, diisobutyl tin dilaurate, etc.), maintaining the temperature at 90-150° C. for reaction for 2-12 h, while maintaining the reaction system at a negative pressure to remove the generated small-molecule alcohol by-products, thereby obtaining the above-mentioned first polyaspartic ester.

In a preferred embodiment of the present application, the first polyaspartic ester further contains a second resin represented by the formula (2),

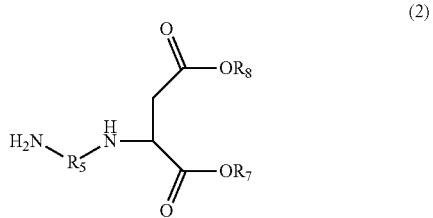

(2)

in particular, $R^5$ is a divalent organic group optionally containing one or more heteroatoms, obtained by removing a primary amino group from a corresponding polyamine having an aliphatically, cycloaliphatically, or aralphatically attached primary amino group and having an average molecular weight in the range of from 60 to 6000 g/mol and may contain a further functional group reactive to an isocyanate group and/or inert at temperatures of up to 100° C.; $R^7$ and $R^8$ are independently selected from a $C_1$-$C_{18}$ alkyl group or a second polyethylene glycol ether group of the general formula —$O(CH_2CH_2O)_nR^9$, in particular, n=1-250, and $R^9$ is a $C_1$-$C_6$ alkyl group; and more preferably, n=5-100.

The weight ratio of the first resin to the second resin is 1-100:1. Preferably, the weight ratio of the first resin to the second resin is 10-50:1. Since the second resin contains a primary amino group, the reactivity to isocyanate is very high and the reaction rate is very fast, and if the content of the second resin is too high, the curing rate of the electrolyte is too fast, thus affecting the performance of the electrolyte. By using the second resin, the crosslinking density can be moderately increased and the strength can be enhanced.

In a preferred embodiment of the present application, the lithium salt is one or more selected from the group consisting of lithium hexafluorophosphate, lithium tetrafluoroborate, lithium trichloromethyl sulfonate, lithium perchlorate, lithium bistrifluorosulfonimide, lithium bistrifluoromethyl sulfonimide, lithium bis(trichloromethyl sulfonate)imide, and lithium tris(trifluoromethyl sulfonyl)methyl.

In a preferred embodiment of the present application, the molar ratio of isocyanate groups in the isocyanate curing agent to active hydrogens on amino groups in the first polyaspartic ester is 1: 1-1.3. The first aspartic acid ester includes a secondary amino group or further includes a primary amino group, with one active hydrogen on one secondary amino group and two active hydrogens on one primary amino group. By controlling the molar ratio of the isocyanate groups in the isocyanate curing agent to the active hydrogens on the amino groups in the first polyaspartic ester in the above range, relatively complete curing of the electrolyte can be obtained, substantially free of unreacted isocyanate groups and with good stability. More preferably, the molar ratio of isocyanate groups in the isocyanate curing agent to active hydrogens on amino groups in the first polyaspartic ester is from 1: 1-1.2, such as 1:1, 1:1.02, 1:1.03, 1:1.05, 1:1.07, 1:1, 1:1.13, 1:1.15, 1:1.18, 1:1.2, etc.

In a preferred embodiment of the present invention, the isocyanate curing agent includes an adduct of a polyhydroxy polyoxyethylene ether with a polyisocyanate monomer, the isocyanate group content of the isocyanate curing agent being not less than 3 wt %. More preferably, the isocyanate curing agent has an isocyanate group content of not greater than 12 wt %.

Using the adduct of the polyhydroxy polyoxyethylene ether and the polyisocyanate monomer as the isocyanate curing agent or one of the components of the isocyanate curing agent, the polyoxyethylene ether can provide better ionic conductivity, improve the ionic conductivity of the electrolyte, and also avoid the problem of brittleness caused by a large crosslinking density.

In a more preferred embodiment of the present application, the polyhydroxy polyoxyethylene ether has an average molecular weight of 200-10000. In the present application, the content of hydroxyl groups in the polyhydroxy polyoxyethylene ether is 2 or more, such as 2, 3, etc. Further preferably, the polyhydroxy polyoxyethylene ether has an average molecular weight of 200-5000.

In a more preferred embodiment of the present invention, the molar ratio of hydroxyl groups in the polyhydroxy polyoxyethylene ether to isocyanate groups in the polyisocyanate monomer is 1:1.2-3. Further preferably, the molar ratio of hydroxyl groups in the polyhydroxy polyoxyethylene ether to isocyanate groups in the polyisocyanate monomer is 1:1.5-2.5, such as a molar ratio of 1:1.5, 1:1.6, 1:1.7, 1:1.8, 1:1.9, 1:2, 1:2.1, 1:2.2, 1:2.3, 1:2.4, 1:2.5, etc.

In a more preferred embodiment of the present application, the isocyanate curing agent further includes an isocyanate trimer, the weight ratio of the adduct to the isocyanate trimer being 50-1:1. The isocyanate trimer can increase the crosslinking density of the polyurea electrolyte. The above-mentioned adduct together with the isocyanate trimer as an isocyanate curing agent can increase the crosslinking density of the electrolyte to a certain extent. Due to the difference in crosslinking density, the effect of "concentrated crosslinking" is formed, and the toughness of the electrolyte is improved. However, too high or too low isocyanate trimer content in the isocyanate curing agent does not favor the formation of a "concentrated cross-linking" effect. Further preferably, the weight ratio of adduct to isocyanate trimer is from 30-5:1, and in particular, the weight ratio may be 30:1, 27:1, 25:1, 22:1, 20:1, 18:1, 15:1, 12:1, 10:1, 8:1, 5:1, etc.

In another aspect of the present application, proposed is a preparation method for the polyurea-based solid electrolyte according to any of the above embodiments, including the steps of adding the lithium salt to the first polyaspartic ester, dispersing uniformly, adding the isocyanate curing agent, mixing uniformly, shaping, and curing, to obtain the polyurea-based solid electrolyte.

In order to improve the mixing effect of each raw material in the above preparation method, an amount of organic solvent may be added before or after the isocyanate curing agent is added to adjust the viscosity. The organic solvent may be DMF, DMAc, butyl acetate, tetrahydrofuran, 1,4-dioxane, ethyl acetate, and the like, and the amount of the organic solvent may be 0.2-5 times the weight of the first polyaspartic ester.

The technical solution of the present application will be described in detail blow in combination with the examples and comparative examples.

Preparation Examples 1-3 Preparation of the First Resin

Preparation Example 1

To a reaction vessel, 1 mol of 4, 4'-diamino dicyclohexylmethane was added and 2.1 mol of dimethyl maleate was added dropwise. Then, the temperature was raised to 70° C. for 48 hours of reaction. The temperature was further raised to 100° C. to hydrate under vacuum for 2 hours. The dimethyl maleate was removed under reduced pressure to obtain a second polyaspartic ester.

0.25 Mol of the above-mentioned second polyaspartic ester was taken and added with 1 g of tetraisopropyl titanate and 0.25 mol of PEG-1000 (1000 represents the molecular weight). The temperature was raised to 120° C. and the system was vacuumized to below −0.095 MPa. The reaction was carried out for 7 hours to obtain the first resin.

Preparation Example 2

This Preparation example was same as Preparation example 1, except for adjusting the molar amount of PEG-1000 to 0.4 mol and the reaction time of 10 hours to 7 hours.

Preparation Example 3

To a reaction vessel, 1 mol of polyether amine ED-600 was added and 2.2 mol of diethyl maleate was added dropwise. Then, the temperature was raised to 70° C. for 60 hours of reaction. The temperature was further raised to 100° C. to hydrate under vacuum for 2 hours. The diethyl maleate was removed under reduced pressure to obtain a second polyaspartic ester.

0.25 Mol of the above-mentioned second polyaspartic ester was taken and added with 1 g of tetraisopropyl titanate and 0.25 mol of PEG-600. The temperature was raised to 120° C. and the system was vacuumized to below −0.095 MPa. The reaction was carried out for 8 hours to obtain the first resin.

Preparation Example 4

This Preparation example was same as Preparation example 3, except for replacing PEG-600 with an equal molar amount of PEG-2000.

Example 1

The molar ratio of secondary amino groups in the first resin of Preparation example 1 to isocyanate groups in the IPDI (isophorone diisocyanate) was 1.03:1.

5 G of lithium bis (trichloromethylsulfonate)imide was added to 100 g of the first resin of Preparation example 1, stirred, and dispersed uniformly. Then IPDI was added and stirred uniformly to obtain an electrolyte composition.

Example 2

The preparation method for the electrolyte composition of this example was same as that of Example 1, except for adjusting the lithium bis(trichloromethylsulfonate)imide to 12 g.

Example 3

The preparation method for the electrolyte composition of this example was same as that of Example 1, except for adjusting the lithium bis(trichloromethylsulfonate)imide to 20 g.

Example 4

The preparation method for the electrolyte composition of this example was same as that of Example 1, except for adjusting the lithium bis(trichloromethylsulfonate)imide to 28 g.

Example 5

The molar ratio of secondary amino groups in the first resin of Preparation example 2 to isocyanate groups in the IPDI was 1.05:1.

18 G of lithium hexafluorophosphate was added to 100 g of the first resin of Preparation example 2, stirred, and dispersed uniformly. Then IPDI and 50 g of butyl acetate were added and stirred uniformly to obtain an electrolyte composition.

Example 6

To a reaction flask, 1 mol of IPDI was added and the temperature was raised to 73° C. 0.5 Mol of PEG-1000 was added in three equal portions, every half hour. After the addition was completed, the reaction was performed at a constant temperature for additional 2 hours to obtain the adduct. The NCO content was determined to be 5.8 wt %.

The preparation method for the electrolyte composition of this example was same as that of Example 5, except for replacing the IPDI with the above adduct in equimolar amounts with respect to the isocyanate groups.

Example 7

To a reaction flask, 1.2 mol of IPDI was added and the temperature was raised to 73° C. 0.5 Mol of PEG-1000 was added in three equal portions, every half hour. After the addition was completed, the reaction was performed at a constant temperature for additional 2 hours to obtain the adduct. The NCO content was determined to be 7.7 wt %.

The preparation method for the electrolyte composition of this example was same as that of Example 5, except for replacing the IPDI with the above adduct in equimolar amounts with respect to the isocyanate groups.

Example 8

To a reaction flask, 1.4 mol of IPDI was added and the temperature was raised to 73° C. 0.5 Mol of PEG-1000 was added in three equal portions, every half hour. After the addition was completed, the reaction was performed at a constant temperature for additional 2 hours to obtain the adduct. The NCO content was determined to be 9.3 wt %.

The preparation method for the electrolyte composition of this example was same as that of Example 5, except for replacing the IPDI with the above adduct in equimolar amounts with respect to the isocyanate groups.

Example 9

The molar ratio of secondary amino groups in the first resin of Preparation example 1 to isocyanate groups in the adduct of Example 7 was 1.02:1.

20 G of lithium tetrafluoroborate was added to 100 g of the first resin of Preparation example 1, stirred, and dispersed uniformly. Then the above adduct and 50 g of DMF were added and stirred uniformly to obtain an electrolyte composition.

Example 10

The preparation method for the electrolyte composition of this example was same as that of Example 9, except for replacing the first resin of Preparation example 1 with the first resin of Preparation example 2 in equimolar amounts with respect to the secondary amino groups in the first resin.

Example 11

The preparation method for the electrolyte composition of this example was same as that of Example 9, except for replacing the first resin of Preparation example 1 with the first resin of Preparation example 3 in equimolar amounts with respect to the secondary amino groups in the first resin.

Example 12

The preparation method for the electrolyte composition of this example was same as that of Example 9, except for replacing the first resin of Preparation example 1 with the first resin of Preparation example 4 in equimolar amounts with respect to the secondary amino groups in the first resin.

Example 13

The preparation method for the electrolyte composition of this example was same as that of Example 9, except for replacing the adduct of Example 7 with a combination of the adduct of Example 7 and IPDI trimer in a weight ratio of 30:1 in equimolar amounts with respect to the isocyanate groups.

Example 14

The preparation method for the electrolyte composition of this example was same as that of Example 9, except for replacing the adduct of Example 7 with a combination of the adduct of Example 7 and IPDI trimer in a weight ratio of 10:1 in equimolar amounts with respect to the isocyanate groups.

Example 15

To a reaction vessel, 1 mol of 4, 4'-diamino dicyclohexylmethane was added and 2.1 mol of diethyl maleate was added dropwise. Then, the temperature was raised to 70° C. for 60 hours of reaction. The temperature was further raised to 100° C. to hydrate under vacuum for 2 hours. The diethyl maleate was removed under reduced pressure to obtain a second resin.

The weight ratio of the first resin of Example 1 to the second resin described above was 12:1, and the molar ratio of active hydrogens on the amino groups in the first and second resins to isocyanate groups in the IPDI was 1.03:1.

The first resin and the second resin were mixed uniformly. 15 G of lithium bis(trichloromethyl sulfonic acid)imide was added, stirred, and dispersed uniformly. Then IPDI and 50 g of butyl acetate were added, and stirred uniformly to obtain an electrolyte composition.

Example 16

The preparation method for the electrolyte composition of this example was same as that of Example 15, except for adjusting the weight ratio of the first resin to the second resin to 30:1.

Example 17

The preparation method for the electrolyte composition of this example was same as that of Example 15, except for adjusting the weight ratio of the first resin to the second resin to 50:1.

Example 18

0.25 Mol of the second resin of Example 13 was taken and added with 1 g of tetraisopropyl titanate and 0.25 mol of PEG-800. The temperature was raised to 120° C. and the system was vacuumized to below −0.095 MPa. The reaction was carried out for 8 hours to obtain a third resin.

The preparation method for the electrolyte composition of this example was same as that of Example 15, except for replacing the second resin with equal parts by weight of the third resin described above.

Comparative Example 1

The preparation method for the electrolyte composition of this example was same as that of Example 5, except for replacing the first resin with the second polyaspartic ester of Preparation example 1 in equimolar amounts with respect to the secondary amino groups.

Comparative Example 2

The molar ratio of secondary amino groups in the second polyaspartic ester of Preparation example 3 to isocyanate groups in the IPDI was 1.02:1.

20 G of lithium tetrafluoroborate was added to 100 g of the second polyaspartic ester of Preparation example 3, stirred, and dispersed uniformly. Then IPDI and 50 g of DMF were added and stirred uniformly to obtain an electrolyte composition.

The electrolyte compositions of Examples 1-18 and Comparative Examples 1-2 were uniformly coated on a glass substrate using a 70-um wire bar, respectively, and vacuum dried and cured at 50° C. for 3 days to obtain a polyurea-based solid electrolyte. The properties were tested.

Ionic conductivity (c) test method: a stainless steel/solid electrolyte membrane/stainless steel symmetric cell was assembled. Alternating-current impedance spectrum test was performed by using an electrochemical workstation to obtain impedance R. The ionic conductivity data were obtained by the ionic conductivity calculation formula 6=L/RS, where L is the thickness of the solid electrolyte, R is the test impedance, and S is the area of the stainless steel sheet. The tests were carried out at 30° C. and 60° C., respectively.

Tear Strength: the test was conducted according to the method specified in GB/T529-2008.

The results are shown in Table 1:

TABLE 1

| | Ionic Electrical Conductivity/S/cm | | Tear Strength/ |
| --- | --- | --- | --- |
| | 30° C. | 60° C. | N/mm |
| Example 1 | $6.5 \times 10^{-5}$ | $7.4 \times 10^{-4}$ | / |
| Example 2 | $2.4 \times 10^{-5}$ | $3.1 \times 10^{-4}$ | / |
| Example 3 | $5.8 \times 10^{-4}$ | $7.2 \times 10^{-3}$ | / |
| Example 4 | $2.7 \times 10^{-4}$ | $3.9 \times 10^{-3}$ | / |
| Example 5 | $8.3 \times 10^{-4}$ | $9.2 \times 10^{-3}$ | 78.4 |
| Example 6 | $1.7 \times 10^{-4}$ | $3.0 \times 10^{-3}$ | 80.2 |
| Example 7 | $3.1 \times 10^{-4}$ | $4.9 \times 10^{-3}$ | 82.6 |
| Example 8 | $5.2 \times 10^{-4}$ | $6.8 \times 10^{-3}$ | 81.3 |
| Example 9 | $4.1 \times 10^{-4}$ | $5.9 \times 10^{-3}$ | 81.4 |
| Example 10 | $2.4 \times 10^{-4}$ | $3.8 \times 10^{-3}$ | 82.2 |
| Example 11 | $2.7 \times 10^{-4}$ | $4.3 \times 10^{-3}$ | / |
| Example 12 | $1.9 \times 10^{-4}$ | $3.1 \times 10^{-3}$ | / |
| Example 13 | $3.2 \times 10^{-4}$ | $4.4 \times 10^{-3}$ | 87.2 |
| Example 14 | $5.1 \times 10^{-4}$ | $5.5 \times 10^{-3}$ | 84.9 |
| Example 15 | $7.8 \times 10^{-4}$ | $9.1 \times 10^{-3}$ | 85.4 |
| Example 16 | $6.6 \times 10^{-4}$ | $7.9 \times 10^{-3}$ | 82.6 |
| Example 17 | $4.5 \times 10^{-4}$ | $6.4 \times 10^{-3}$ | 79.3 |
| Example 18 | $5.1 \times 10^{-4}$ | $6.8 \times 10^{-3}$ | 88.3 |
| Comparative Example 1 | $3.5 \times 10^{-5}$ | $4.9 \times 10^{-4}$ | / |
| Comparative Example 2 | $1.2 \times 10^{-5}$ | $2.1 \times 10^{-4}$ | / |

It can be seen from the data in Table that the introduction of a polyethylene glycol segment at the end group of the polyaspartic ester in the present application can significantly improve the ionic conductivity of the electrolyte, and the toughness and strength of the electrolyte membrane can be further improved by further designing the structure.

This specific embodiment is only an explanation of the present application and is not a limitation of the present application. Those skilled in the art may make non creative modifications to the present embodiment as needed after reading this specification, but as long as it falls within the scope of the claims of the present application, it is protected by the patent law.

What is claimed is:

1. A polyurea-based solid electrolyte, wherein raw material components of the polyurea-based solid electrolyte comprise a first polyaspartic ester, a lithium salt, and an isocyanate curing agent;

the first polyaspartic ester contains a first resin represented by formula (1),

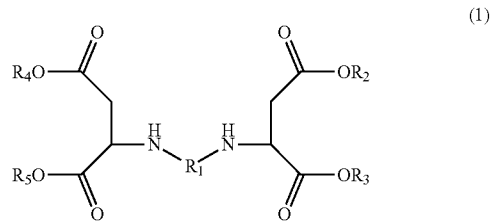

(1)

wherein $R^1$ is a divalent organic group optionally containing one or more heteroatoms, obtained by removing a primary amino group from a corresponding polyamine having an aliphatically, cycloaliphatically, or araliphatically attached primary amino group and having an average molecular weight in a range of from 60 to 6000 g/mol, and optionally containing a further functional group at least one of reactive to an isocyanate group or inert at temperatures of up to 100° C.; $R^2$, $R^3$, $R^4$, and $R^5$ are independently selected from a $C_1$-$C_{18}$ alkyl group or a first polyethylene glycol ether group of a general formula —$O(CH_2CH_2O)_m R^6$, and at least one of $R^2$, $R^3$, $R^4$, and $R^5$ is the first polyethylene glycol ether group, wherein m=1-250, and $R^6$ is a $C_1$-$C_6$ alkyl group; and a weight of the lithium salt is 3-30% of a weight of the first polyaspartic ester.

2. The polyurea-based solid electrolyte according to claim 1, wherein the first resin is obtained by transesterification of a second polyaspartic ester corresponding to $R^2$, $R^3$, $R^4$, and $R^5$ in the formula (1) independently selected from a $C_1$-$C_{18}$ alkyl group with a polyethylene glycol monoalkyl ether $HO(CH_2CH_2O)_m R^6$.

3. The polyurea-based solid electrolyte according to claim 1, wherein the first polyaspartic ester further contains a second resin represented by formula (2),

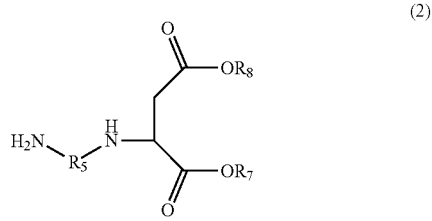

(2)

wherein $R^5$ is a divalent organic group optionally containing one or more heteroatoms, obtained by removing a primary amino group from a corresponding polyamine having an aliphatically, cycloaliphatically, or araliphatically attached primary amino group and having an average molecular weight in the range of from 60 to 6000 g/mol, and optionally containing a further functional group at least one of reactive to an isocyanate group or inert at temperatures of up to 100° C.; $R^7$ and $R^8$ are independently selected from a $C_1$-$C_{18}$ alkyl group or a second polyethylene glycol ether group of a general formula —$O(CH_2CH_2O)_n R^9$, wherein n=1-250, and $R^9$ is a $C_1$-$C_6$ alkyl group; and a weight ratio of the first resin to the second resin is 1-100:1.

4. The polyurea-based solid electrolyte according to claim 1, wherein the lithium salt is one or more selected from the group consisting of lithium hexafluorophosphate, lithium tetrafluoroborate, lithium trichloromethyl sulfonate, lithium perchlorate, lithium bistrifluorosulfonimide, lithium bistrifluoromethyl sulfonimide, lithium bis (trichloromethyl sulfonate)imide, and lithium tris(trifluoromethyl sulfonyl) methyl.

5. The polyurea-based solid electrolyte according to claim 1, wherein a molar ratio of isocyanate groups in the isocyanate curing agent to active hydrogens on amino groups in the first polyaspartic ester is 1:1-1.3.

6. The polyurea-based solid electrolyte according to claim 1, wherein the isocyanate curing agent comprises an adduct of a polyhydroxy polyoxyethylene ether with a polyisocyanate monomer, a content of the isocyanate group in the isocyanate curing agent being not less than 3 wt %.

7. The polyurea-based solid electrolyte according to claim 6, wherein the polyhydroxy polyoxyethylene ether has an average molecular weight of 200-10000.

8. The polyurea-based solid electrolyte according to claim 6, wherein a molar ratio of hydroxyl groups in the polyhydroxy polyoxyethylene ether to isocyanate groups in the polyisocyanate monomer is 1:1.2-3.

9. The polyurea-based solid electrolyte according to claim 6, wherein the isocyanate curing agent further comprises an isocyanate trimer, a weight ratio of the adduct to the isocyanate trimer being 50-1:1.

\* \* \* \* \*